United States Patent [19]

Yamamoto et al.

[11] Patent Number: 5,001,684
[45] Date of Patent: Mar. 19, 1991

[54] CONTROL COMPONENT HAVING A TERMINAL MEMBER

[75] Inventors: Hiroyuki Yamamoto, Kyoto; Katsumi Iwatani, Yawata; Yasuhiko Ueno, Nagaokyo, all of Japan

[73] Assignee: Omron Tateisi Electronics Co., Kyoto, Japan

[21] Appl. No.: 107,904

[22] Filed: Oct. 13, 1987

Related U.S. Application Data

[63] Continuation of Ser. No. 817,035, Jan. 8, 1986, abandoned.

[30] Foreign Application Priority Data

Jan. 9, 1985 [JP] Japan .................... 60-1303

[51] Int. Cl.⁵ .................... G04B 1/00; G04C 3/00
[52] U.S. Cl. .................... 368/204; 174/59; 174/60; 368/276
[58] Field of Search .................... 368/270, 107–112, 368/89, 10

[56] References Cited

U.S. PATENT DOCUMENTS

| 1,235,069 | 7/1917 | Skinner | 174/59 |
| 1,302,137 | 4/1919 | Cook | 174/60 |
| 3,299,199 | 2/1964 | Mattingly | 174/59 |

FOREIGN PATENT DOCUMENTS

595916 10/1925 France .................... 174/5 R

*Primary Examiner*—Bernard Roskoski
*Attorney, Agent, or Firm*—Dickstein, Shapiro & Morin

[57] ABSTRACT

A control component accessible from its front comprising a main body housing a control circuitry, connection terminal member fixed on the main body which is operable from a front side of the component, and slide member slidably mounted on a front wall of the main body so as to in an original position cover the connection terminal member and in a slide position expose the same to the front side of the component.

2 Claims, 2 Drawing Sheets

CONTROL COMPONENT HAVING A TERMINAL MEMBER

This application is a continuation, of application Ser. No. 817,035, filed 1/8/86 now abandoned.

BRIEF SUMMARY OF THE INVENTION

This invention relates to a control component having a connection terminal member, and more particularly to an improved control component, such as a timer or the like, having a front connection terminal member mounted on the component so as to be connectable from a front side of the component.

When such a timer is installed on a pole or a wall of a room or a rail within a device, it is desirable to be able to connect an external wire to a connection terminal member of the timer from a front direction thereof. Heretofore, there has been proposed a timer having a front panel constituted with an operational section and an external or a front connection section. The conventional timer has the disadvantages that the operational section is reduced by the front connection section with respect to space and a safety cover must be mounted on the connection terminal member at a front wall for covering the same for a safety reason with unfavorably increasing the number of parts to be assembled.

It is, therefore, a primary object of this invention to provide a control component having a terminal member to which an external cable can be connected on a front panel of the component without reducing the space of a display and operational panel.

According to one aspect of this invention, there is provided a control component accessible from its front comprising a main body housing a control circuitry, connection terminal means fixed on the main body which is operable from a front side of the component, and slide means slidably mounted on a front wall of the main body so as to in an original position cover said connection terminal means and in a slide position expose the same to the front side of the component.

Other objects and numerous advantages of the control component according to this invention will become apparent from the following description taken in conjunction with the accompanying drawings, in which:

DETAILED DESCRIPTION

Figure 1:
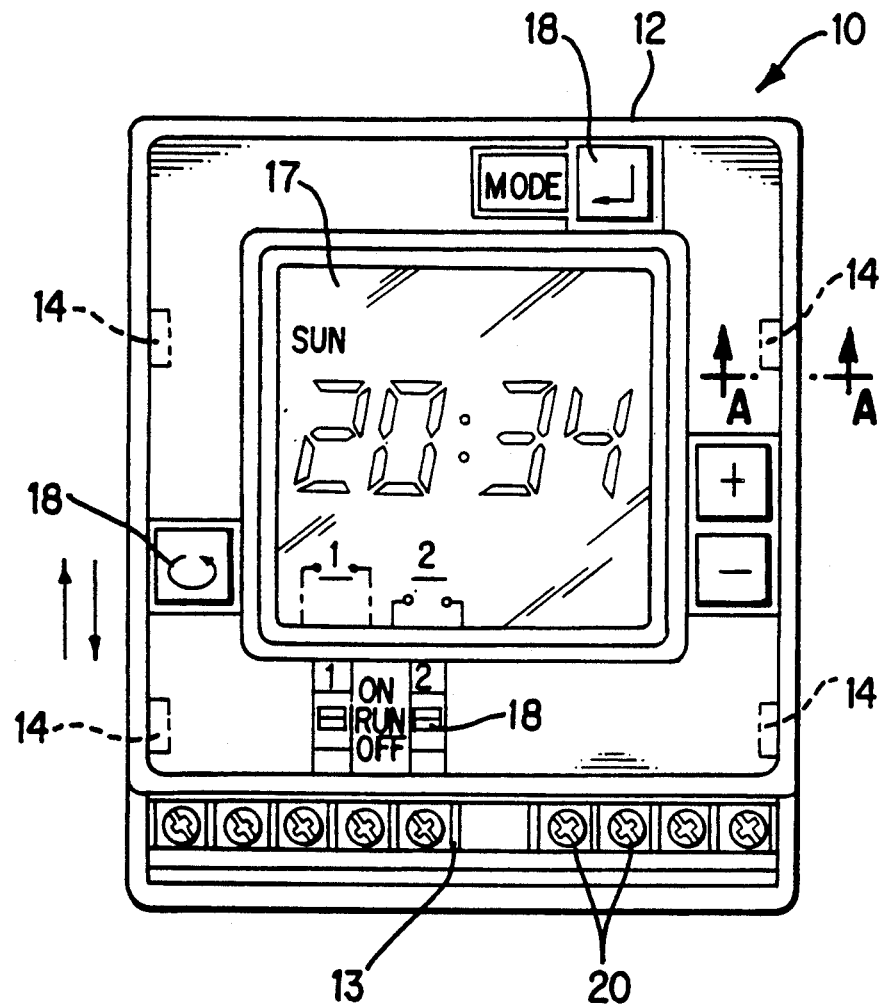
FIG. 1 is a front view of a control component as a preferred embodiment of this invention.
Figure 2:
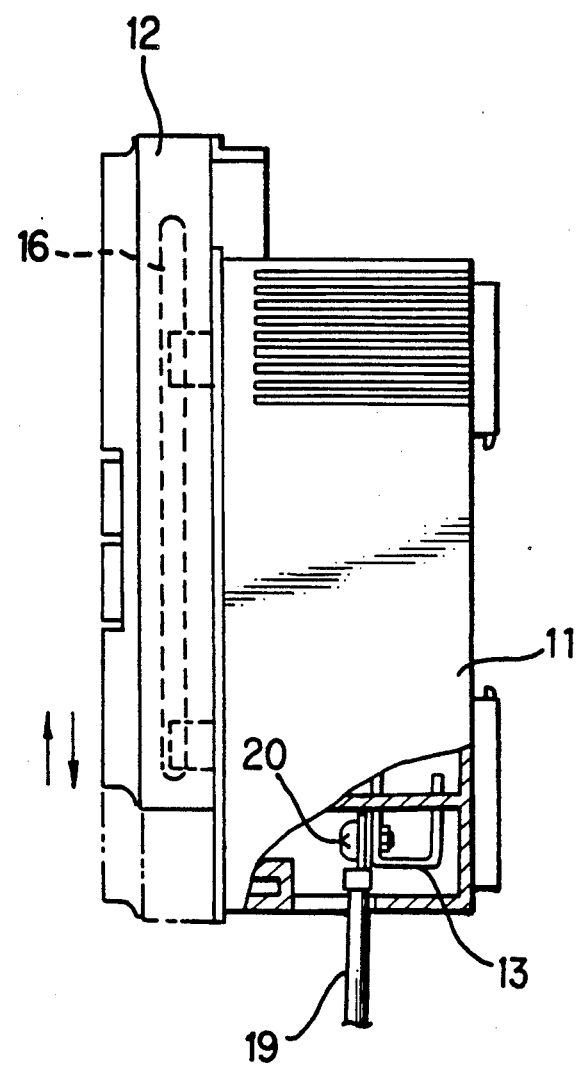
FIG. 2 is a side view of the control component of FIG. 1 a housing of which is partially removed.

Referring, now, to FIG. 1, there is shown a timer 10 in a slide position including a connection terminal member 13 as a preferred embodiment of this invention. FIG. 2 shows a side view of the timer of FIG. 1 in which a slide member 12 is mounted on a front wall of a main body 11 of the timer 10 for a vertical slidable movement. On a lower portion of the main body 11 there is fixed the connection terminal member 13 behind the slide member 12 in an original position.

Figure 3:
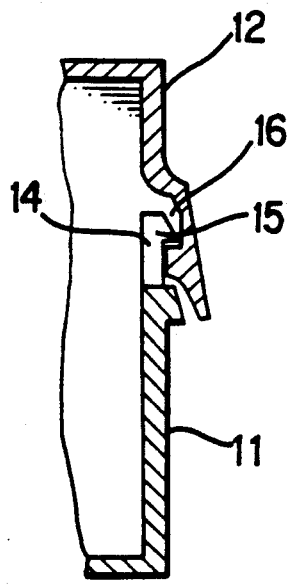
FIG. 3 is an enlarged partial view of the component of FIG. 1 taken along the line A—A.

As shown in FIG. 3 taken along the line A—A in FIG. 1, a pair of posts 14 stand on the front wall of the main body 11 on each side thereof, and each of the posts 14 includes a nail 15 to be engaged with a guide groove 16 vertically formed on each inner side wall of the slide member 12. The slide member 12 is slidably mounted on the front wall of the body 11 by a relative movement of nails 14 and grooves 16 which are engaged each other by pushing the nails 15 within the grooves by force. The highest position of the slide member 12 is restricted by the lower posts 14 coming into contact with the lower ends of the grooves 16.

On a front wall of the slide member 12 there are disposed a liquid crystal display 17 for displaying a time and operation keys 18 therearound which are interconnected with a control circuit housed within the main body 11.

When thus constructed timer 10 is mounted on a wall or a pole in a room or on a rail within a device, it can be connected with an external wire 19 by sliding up the slide member 12 to expose the terminal member 13 as shown in FIG. 1 and driving a screw 20 after inserting the wire from the bottom. After such connection, the slide member 12 is moved downwardly to its original position.

The connection terminal member 13 is normally covered with the slide member 12, so that it is not exposed to the external and an electrical safety is ensured. The front wall of the slide member 12 can be fully used for display 17 and operation keys 18 without reducing its space by the terminal member 13, and further play a role of a cover for the terminal member 13 without increasing the number of parts by a cover therefor. The slide member 12 further includes a self-lock mechanism, not shown in the drawings, whereby a power circuit within the timer is adapted be disenergized when the slide member 12 is slidden off to expose the terminal member 13 for maintenance purpose. This further ensures the operational safety for an operator.

Thus, the timer according to this embodiment can have a front panel fully shared by an operational and/or a display portion, the front panel being adapted to uncover a connection terminal member by sliding the front panel for wiring or maintaining the terminal member, so that it is improved in view of ornamental design, space and safety.

Though the timer is employed in this embodiment, it should be understood that other control component than the timer may be applied by this invention, in which a front panel may be solely a display or an operation switch assembly, or include both display and operation switch.

It should be understood that the above description is merely illustrative of this invention and that many changes and modifications may be made by those skilled in the art without departing from the scope of the appended claims.

What is claimed is:

1. A front access control component, comprising:
   a main body for housing control circuitry, said main body including a rear wall, upper and lower walls, and side walls;
   connection terminal means disposed within said main body and fixed to one of said walls thereof;
   a slide panel means forming a front wall slidably mounted on said main body, said slide panel means being slidable between a first position in which said slide panel means covers said connection terminal means relative to a front direction of said control component and a second position in which said panel means does not cover said connection means relative to said front direction, so that said connection terminal means is exposed with respect to said front direction;

said slide panel means including a data display means and an operation switch both disposed on the front side thereof, said display means being a liquid crystal display; and said control circuitry being electrically connected to said slide panel means.

2. A control component according to claim 1, wherein said slide panel means and said main body are slidably engaged with each other in a nail and groove relationship.

* * * * *